G. W. McGILL.
METALLIC FASTENER.
APPLICATION FILED MAY 9, 1906.

900,299.

Patented Oct. 6, 1908.
3 SHEETS—SHEET 1.

Witnesses
S. R. Appleman
W. Harry McGill

Inventor
George W. McGill

G. W. McGILL.
METALLIC FASTENER.
APPLICATION FILED MAY 9, 1906.

900,299.

Patented Oct. 6, 1908.

3 SHEETS—SHEET 2.

Witnesses
A. R. Appleman
W. Harry McGill

Inventor
George W. McGill

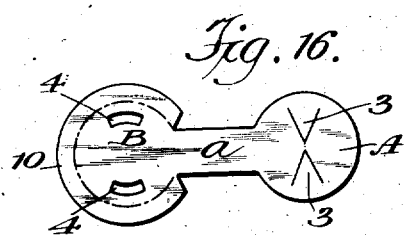
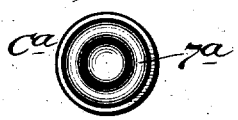
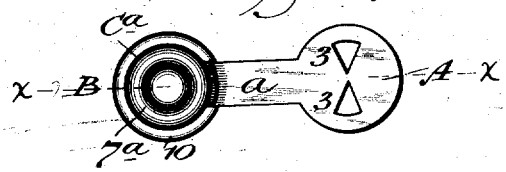
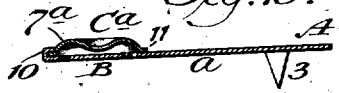
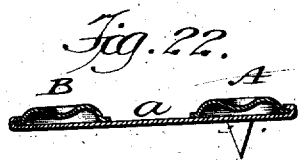
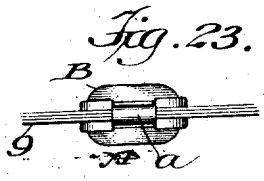

UNITED STATES PATENT OFFICE.

GEORGE W. McGILL, OF NEW YORK, N. Y.

METALLIC FASTENER.

No. 900,299.     Specification of Letters Patent.     Patented Oct. 6, 1908.

Application filed May 9, 1906. Serial No. 315,868.

*To all whom it may concern:*

Be it known that I, GEORGE W. McGILL, a citizen of the United States, and a resident of No. 1 Madison avenue, in the borough of Manhattan, in the city, county and State of New York, have invented certain new and useful Improvements in Metallic Fasteners, of which the following is a specification.

My invention consists in a metallic fastener having for its object the fastening together of sheets of paper, and for other light binding, and consists of a fastener fashioned from sheet metal comprising two clamping members, occupying adjacent planes and adapted to be folded over one upon the other and to hold and clamp between them the paper or other materials being bound, one of such members having its facing surface furnished with one or more depressions providing it sunken anvil-surfaces and the other member having its facing surface provided with prongs which, on the free ends of the members being brought toward each other in applying the fastener as intended, will pierce the material being fastened and register in the depressions or sunken anvil-surfaces of the other member, which anvil-surfaces from their formation will automatically deflect or bend the free ends of the prongs down over said material and house and guard them, both while the fastener is being applied and thereafter, as is hereinafter more fully described.

Figure 1:
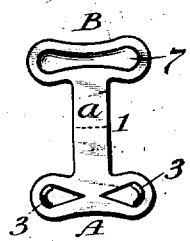
Figure 5:
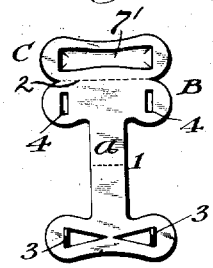
Figure 7:
Figure 2:
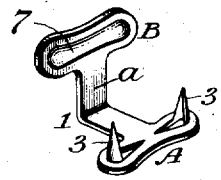
Figure 3:
Figure 6:
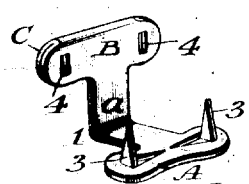
Figure 8:
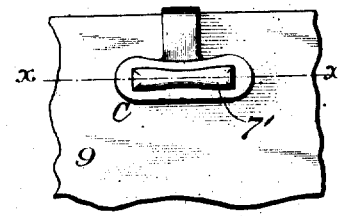
Figure 4:
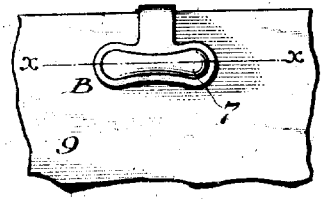
Figure 9:
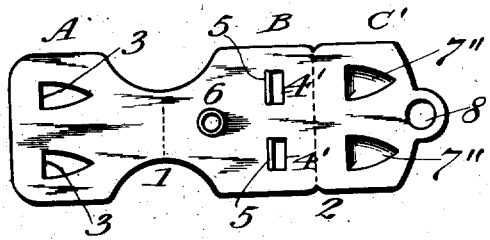
Figure 10:
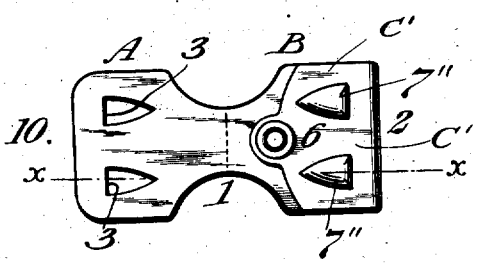
Figure 11:
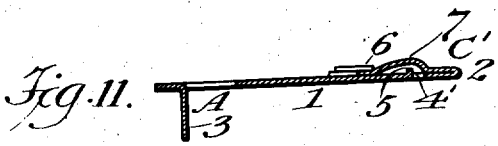
Figure 12:
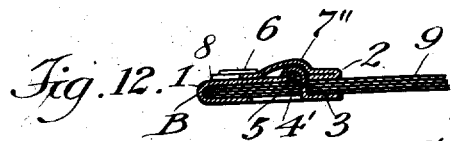
Figure 13:
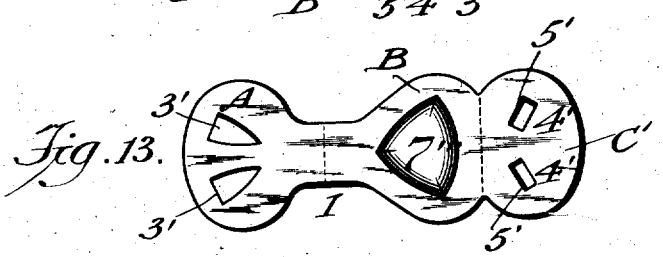
Figure 14:
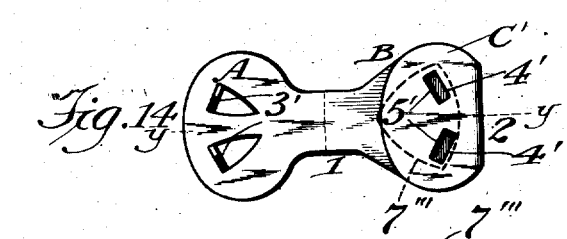
Figure 15:
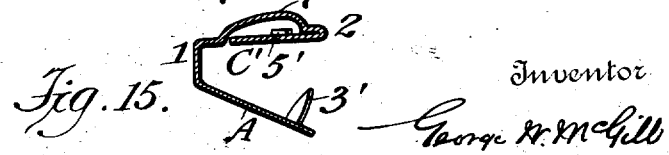

In the accompanying drawing forming part of this specification, and in which similar letters and numerals of reference indicate corresponding parts, Figure 1, represents a plan view of the body of the fastener in flat or unfolded condition. Fig. 2, is a perspective view of the folded fastener in condition for application to the use intended. Both these figures present the inner or facing surface of the finished fastener. Fig. 3, is a sectional view of both the clamping members of the fastener applied as intended in fastening together several sheets of paper, the view being taken on line $x$ $x$ of Fig. 4, the latter figure being a top view of the fastener so applied. Figs. 5 to 8 inclusive, illustrate a modified construction of the fastener, Fig. 5, being a plan view of the modified fastener in flat or unfolded condition, similar to Fig. 1. Fig. 6, is a perspective view of the modified fastener. Fig. 7, is a sectional view of the clamping members of the modified fastener, applied as intended, and is taken on the line $x$ $x$ of Fig. 8, which presents a top view of the modified fastener so applied. Figs. 9 to 12, inclusive, illustrate another modified construction of the fastener, Fig. 9, being a plan view of the modified fastener before folding its parts into position. Fig. 10, is a similar view showing a partial folding of the parts. Fig. 11, presents a longitudinal section of Fig. 10, taken on the line $x$ $x$, of that figure, and Fig. 12, a similar sectional view of the folded modified fastener applied in binding sheets of material. Figs. 13, 14 and 15, illustrate another modification in the construction of the fastener. Fig. 13, presenting a plan view of the unfolded fastener, Fig. 14, a similar view showing the fastener partly folded, and Fig. 15, presenting a sectional view of the fastener taken on the line $y$ $y$, of Fig. 14, and in finished fold and condition for application to the purposes intended. Figs. 16 to 23, inclusive present still another modified construction of the fastener wherein it is provided a duplex button configuration. Fig. 16, is a plan view of the metal blank providing the clamping members of the device. Fig. 17, is a plan view of the convex surface of the anvil section which in this modification of the fastener construction is shown non-integral with the rest of the device. Fig. 18, is a top or outer view of the unfolded fastener with the anvil section forming Fig. 17, attached. Fig. 19, is a longitudinal section of Fig. 18, taken on the line $x$ $x$, of that figure. Fig. 20, is a perspective view of the completed fastener, and Fig. 21, is a transverse sectional view of the completed fastener applied in binding several sheets of material. Fig. 22, is another longitudinal section of the unfolded fastener showing both end members similarly collared and capped, and Fig. 23, is a transverse view of the connected edges of the fastener, so constructed when applied to use as intended.

In Figs. 1 to 5, inclusive, A and B, represent the clamping members of the fastener, and $c$, represents a unitary neck connecting such members. The member A, is provided with two prongs 3, 3, connecting at their respective roots integrally with the body of that member near its opposite ends, and projecting outward in the same direction, and at right angles from such body, and with their inner surfaces facing each other. The member B, is provided with two reëntrant grooved or chambered anvils 7 struck or sunk therein deeper and wider at one end than at their other end as shown in said figures and are seated in alinement with their shallow ends facing each other and substantially connecting with each other thereat as shown in Fig. 3, and providing concave deflecting anvil surfaces, narrowing in width as their depth decreases, their deeper ends being seated apart a distance corresponding with the distance apart of the roots of the prongs, 3, 3. The members A and B, so fashioned, are brought toward each other as shown in Fig. 2, by folding their connecting neck a, at its center or along the transverse dotted line, 1, completing the fastener.

The fastener is applied as intended by placing the material 9, to be bound, between its clamping members A and B, and pressing these members together between the finger and thumb of the operator, or in other manner, which causes the free end of the prongs 3, 3, of the member to pierce and pass through the material and into the chambered anvils 7, where, on coming in contact with the deep curved ends of the anvils they are deflected toward each other over the opposite surface of the material being fastened, and are housed in the chambered anvils, and covered, guarded and concealed by them beneath the member B. The prongs 3, 3, in Figs. 1 and 2 are shown transversely curved to give them increased strength without increase in weight of metal, and they are set near enough to each other in the member A, to enable them to be pressed upon simultaneously by the thumb of the operator applying the fastening, in forcing them through the material being bound and against the deflecting anvil surfaces in the member B, on the opposite side of the material.

In the modified construction of the fastener shown in Figs. 5 to 8, inclusive, the clamping member B, is provided with an adjoining section of metal C, extending from its outer edge and substantially duplicating that member in size and form. The chambered anvils 7', instead of being sunk in the member B, are sunk in this section C, and the member B, is provided with the apertures 4, 4, near its ends. The section C, is folded at the dotted line 2, over upon the member B, in manner to bring the curved or deflecting ends of the chambered anvils 7' over the apertures 4, 4, in the member B, as shown in Fig. 6, so that the free ends of the prongs 3, 3, on passing through the material being bound, as before described, will enter these apertures and be deflected down upon the inner, or covered surface of the member B, instead of directly upon the bound material, the section C, of the member B, in this construction, serving as a washer, or bur, for the prongs 3, 3, in securely locking and clamping the members A and B, together, with the bound material secured between them impaled on said prongs, as is shown in Fig. 7. The prongs 3, 3, in this construction have a flat formation instead of being transversely curved as shown in Figs. 1 and 2.

In the modified construction of the fastener shown in Figs. 9 to 12, inclusive, the prongs 3, 3, of the member A, also have a flat-blade-like formation instead of a transversely curved one and are set in adjoining parallel planes and face in the same direction, instead of toward each other as in other figures of the drawing. An edge of each of the apertures 4', 4', in the member B, is provided with lips 5, 5, and the member is provided with a tubular riveting pillar 6. The section C', is provided with two chambered anvils 7", 7", corresponding in position therein with the position of the prongs 3, 3, in the member A, and such section C', is also provided with an eye, 8, at its free end. The folding of the section C', at the line 2, over upon the member B, brings the eye, 8, of the former, over the riveting pillar 6, of the latter, and the concave surfaces of the chambered anvils of the former over the apertures 4', 4', in the latter, in which position they are permanently held by upsetting the top of the tubular pillar 6, upon that part of the free end of the section C', forming a flange for the eye, 8, as is shown in Figs. 10 and 11, and whereby these parts are permanently riveted together.

The distance between the curved surfaces of the anvils 7. 7. above that part of the surface of the member B covered by them should be sufficient to admit of the deflection of the prongs 3. 3. respectively over the lips forming one side of the apertures 4. 4. and down upon such surface of the member B. The object of these lips being to secure the tight locking together of the clamping members by providing fulcrums, or props, over which the prongs are bent and deflected with their points bearing against the covered surface of the member B, as is shown in the sectional Fig. 12, of the applied device.

Figs. 13, 14 and 15, show a further modification in the construction of the fastener consisting in the riveting pillar 6, and the eye, 8, being omitted and the location of the apertures 4', 4', and clenching anvils 7", 7", transposed, and such apertures and their lips 5', 5', and the prongs set in the respective members B and A, on lines oblique with the axis or longitudinal direction of the device. They also show the section C', folded in and under the member B, instead of out and over it as in the other modified constructions, and show the deflecting anvils 7", 7", merged into a single anvil 7''', which by reason of its area, and of its position in the member B, is adapted to receive, deflect, clench and house both of the dies or prongs 3", 3", within it simultaneously.

In the modified construction of the fastener shown in Figs. 16 to 23, inclusive, the clamping members A and B, are nearly circular in configuration, and the periphery of the member B, is folded upward into a collar 10. The section C^a, of the member B, which provides the latter its clenching anvil surface, consists in a separate round piece, or disk, of metal fashioned like a button-cap, having a flanged periphery and within such flange an annular concavo-convex groove providing it a radially deflecting anvil surface 7^a. This section C^a, is placed within the collar 10, of the member B, with its concave surface facing inward, which brings the outer edge of its radially deflecting anvil surface, or annular groove 7^a, slightly outside the outer edge of the prong-receiving apertures 4, 4, and in which position it is held by the edge of the collar 10, being turned over its periphery, or flange 11, as shown in Figs. 18–23, inclusive. In Fig. 22, which represents another longitudinal section of the fastener before being folded, the periphery of the member A, is shown provided with a collar similar to the member B, and with a separate metal section, or disk, shaped similar to the section C^a, of the member A, and inserted therein in similar manner, causing the outer surfaces of both members to present the same finished appearance. This stud-like appearance is shown more clearly in Fig. 23, which presents an edge view of the fastener thus constructed applied in binding several sheets of material as intended.

The principal novel features of the fastener herein set forth over the fastener described and claimed in a companion application for Letters Patent, filed by me April 12, 1906, and bearing Serial No. 311,224, is that the construction herein set forth provides the clamping members of the device with a plurality of fastening prongs, and with means for simultaneously receiving, deflecting and clenching such prongs, to the end of securely holding the material bound and preventing the lateral shifting, swinging or other displacement of any sheet or other part of such material, which swinging displacement will occur when the penetrating part of the fastening consists of a single prong, and to prevent which the application of two fasteners is necessary.

Having thus fully described my invention what I claim as new and desire to secure by Letters Patent is:—

1. A metallic fastener of the character described consisting of two integrally connected clamping members adapted to receive between their facing surfaces the material being fastened, one member being provided with a plurality of penetrating prongs and the other member being provided with a plurality of reëntrant cavities to each of which there is but one opening, such cavities providing sunken anvils with curved faces which automatically register with said prongs and bend the free ends of the latter down over the material being fastened and conceal, guard and house them thereon on the free ends of said clamping members being pressed toward each other.

2. A metallic fastener of the character described consisting of two integrally connected clamping members adapted to receive between their facing surfaces the material being fastened, one member being provided with a plurality of penetrating prongs and the other member being provided with sunken and curved anvil surfaces opening in one direction and which automatically register with said prongs and which bend the free ends of the latter down over the material being fastened and conceal, guard and house them thereon on the free ends of said clamping members being brought toward each other.

3. A metallic fastener of the character described having one of its integrally connected clamping members provided with a plurality of penetrating prongs and having its other clamping member provided with a plurality of slots to receive such prongs and with a plurality of reëntrant cavities to each of which there is but one opening, such cavities providing said member with sunken anvils having curved faces and said member being folded in manner to seat such cavities in reverse position over such slots and opening into them.

4. In a metallic fastener of the character described the combination of two integrally connected clamping members adapted to receive between their facing surfaces the material being fastened, one of such members being provided with a plurality of slots and with a plurality of depressions covering such slots and the other member being provided with a plurality of penetrating prongs registering with such slots and depressions, and said prongs being seated in their member sufficiently close together to enable the thumb of the user to bear simultaneously upon the rooted ends of both prongs in forcing the prongs through said material.

Signed at Riverdale-on-Hudson in the county of New York and State of New York this 14th day of April A. D. 1906.

GEORGE W. McGILL.

Witnesses:
W. HARRY McGILL,
GEO. A. CLARK.